3,104,985
CONDUCTING POLYMER COMPOSITIONS
Frank R. Williams, Squantum, Manuel F. Perdigao, Brighton, and Bram B. S. T. Boonstra, Sharon, Mass., assignors to Cabot Corporation, Boston, Mass., a corporation of Delaware
No Drawing. Filed Jan. 6, 1959, Ser. No. 785,129
5 Claims. (Cl. 117—226)

This invention relates to cured polyolefin compositions and in particular to a novel process for producing and applying to a substrate, curable polyolefin films containing fillers.

It is a principal object of the present invention to produce curable films or coatings of a filled polyolefin on substrates.

Another object of the present invention is to produce strong films or coatings of a filled cured polyolefin on substrates such as glass, primed and unprimed metal, cardboard, fibre glass, cloth, plastics, etc.

Another object of the present invention is to produce highly conductive tapes and the like for use in electrical applications.

In accordance with the present invention, it was discovered, that filled, curable polyethylene films can be cast from solution. It was discovered that if polyethylene and a soluble curing agent are dissolved in a solvent and a filler is added thereto and well dispersed therein, the solution can thereafter be cast, painted, spread or otherwise deposited to form a film or coating on a substrate. This film, after the solvent is evaporated, can be cured by being heated to a suitably high temperature to produce a strong film having excellent physical properties.

In the interest of clarity and brevity, only polyethylene is initially mentioned in the specification as a suitable polyolefin for the purposes of the present invention. It is desired that it be clearly understood however, that other polyolefins can be utilized in place of polyethylene.

Suitable solvents for the purposes of the present invention are those substances in which polyethylene is substantially soluble but which do not inhibit the curing action of the curing agents utilized. Of course, the solvent must be evaporable at temperatures below that temperature at which any substantial amount of curing occurs. In general, aromatics and, in particular, substituted benzene derivatives such as xylene and toluene are preferred. Other aromatics such as diethylbenzene, trichloroethylene, carbon tetrachloride and methyl naphthalene are also suitable.

Fillers suitable for the practice of this invention are those commonly employed as reinforcing agents in cured polyethylene. Thus, any finely-divided inorganic pigment such as carbon black, metal oxides, wood flour, Wollastonite, kaolin clays, and the like are satisfactory. These fillers may be present in the cured film in amounts up to about 500 parts by weight per 100 parts of polymer. Improvement in the properties of filled films over unfilled films is most notable in respect to strength, resistance to abrasion and stress cracking and to lack of deterioration from weathering, elevated temperatures and aging. Since these properties are particularly outstanding when carbon black is the filler, such filler is naturally to be preferred.

The specific curing agents utilized in the present invention are not in themselves critical. Any of the curing agents which are suitable for curing polyethylene and are soluble or are dispersible in the particular solvent utilized to the extent of from about 0.1 to about 10% by weight of the polymer are in general useful as curing agents for the films of the present invention. For example, organic peroxides which are soluble in the specific solvent utilized or which are available in powdered form (and therefore are dispersible therein) and which contain the hydrogen peroxy group (O—O—H) or in which both oxygen atoms of the peroxy group (O—O—) are joined to organic radicals are suitable for the purposes of the present invention. The organic radicals in these peroxides may be selected from the class consisting of alkyl, cycloalkyl, aryl, aralkyl, acyl, alkenyl, cycloalkenyl, and any such groups bearing substituent groups which do not render the peroxide dangerously unstable or so excessively stable that it will not decompose upon the application of that amount of heat which can safely be tolerated by the polymer. For example, alkyl, cycloalkyl, aryl, aralkyl, halogen, hydroxyl, alkoxy, aryloxy, carboxy, nitro and peroxy groups are all generally suitable substituents, at least individually.

Also suitable for use as curing agents in the process of the present invention are those of the quinone oximes and the quinone oxime derivatives disclosed in copending U.S. Patent applications Serial Nos. 767,756 and 767,776 of D. B. Smith and James C. MacKenzie, filed October 17, 1958, both now abandoned, which are soluble in the particular solvent utilized or are dispersible therein.

It should be noted that the process of the present invention is suitable for producing cured and filled films or coatings of both high and low density polyethylene. Also in addition to polyethylene other polyolefins such as polypropylene, polybutylene, copolymers thereof and mixtures thereof are also suitable for the purposes of the present invention.

There follow a number of examples which should be regarded as illustrative and as in no way limiting the scope of the present invention.

*Example 1*

100 grams of "Alathon 10," a polyethylene having a density of 0.92 produced by E. I. du Pont de Nemours & Company was dissolved in 500 grams of hot xylene. To the hot solution were added 80 grams of medium thermal carbon black and 3 grams of dicumyl peroxide. The solution was then agitated in a "Waring Blendor" until a good dispersion of the carbon black and the dicumyl peroxide was achieved. A glass slide was then dipped into the solution and subsequently maintained at a temperature of about 250–300° F. in a hot air furnace until all the xylene had evaporated from the film and the film had fused. The slide was then heated to about 450° F. for about 3 minutes to effect curing of the film. Adhesion of the film to the glass slide was found to be excellent. The film was found to be 81% insoluble as determined after extraction in xylene for 24 hours at 175° F.

*Example 2*

100 grams of "Alathon 10," was dissolved in 500 grams of hot xylene. To the hot solution were added 120 grams of medium thermal carbon black and 3 grams of dicumyl peroxide. The solution was then mixed in a "Cowles Dissolver" until a good dispersion of the carbon black was achieved. The dicumyl peroxide was next mixed in. A piece of cardboard was dipped into the solution, removed, and subsequently maintained at a temperature of about 250–300° F. in a hot air furnace until all the xylene had evaporated from the film and the film had fused. The coated paper was then heated to about 450° F. for 3 minutes to effect curing of the film. Adhesion of the film to the carboard was found to be excellent and the film was found to be 85% insoluble after extraction in xylene for 24 hours at 175° F.

Example 3

50 grams of "Profax," a polypropylene having a density of .90 produced by Hercules Powder Company, Inc., was dissolved in 500 grams of diethylbenzene. To the hot solution were added 50 grams of medium thermal carbon black and 5 grams of dicumyl peroxide. The solution was then mixed in a "Cowles Dissolver" until a good dispersion of the carbon black was achieved. The dicumyl peroxide was next mixed in. A piece of carboard was dipped into the solution, removed, and subsequently maintained at a temperature of about 250–300° F. in a hot air furnace until all the diethylbenzene had evaporated from the film and the film had fused. The coated paper was then heated to about 500° F. for 3 minutes to effect curing of the film. Adhesion of the film to the cardboard was found to be excellent.

In one embodiment of the invention, cured and filled polyethylene film is produced by applying a solution of the type utilized in Examples 1 and 2 onto a continuous, moving substrate, such as a smooth aluminum endless belt arrangement. This film is then continuously cured by passing the substrate through a heating zone. Finally, the cured film is stripped from the substrate in any convenient manner.

In another embodiment of the invention highly conductive fillers and blends of highly conductive fillers and ordinary fillers are utilized to produce highly conductive tape. Such highly conductive tape is utilized in the electrical industry as a winding or "lapping" on high tension cables and the like, to reduce or eliminate "corona" effect. There follows an illustrative example of such a tape produced according to the present invention.

It should be pointed out that considerable difficuly was encountered in dispersing large quantities, that is above about 50 parts by weight, per 100 parts of polymer of conductive blacks into the solution. However, it was discovered that if a polymer composition were filled with a blend of conductive carbon black and ordinary carbon black, total loadings of as high as 125 parts or more were obtainable and that compositions containing these blends exhibited very high conductives.

Example 4

100 parts of "Alathon 10," 80 parts of medium thermal carbon black, 20 parts of "Vulcan XC–72," a highly conductive black produced by Godfrey L. Cabot, Inc., and 1.7 parts of dicumyl peroxide were milled in a Banbury mixer until a substantially homogeneous composition was obatined. 40 grams of the granulated composition was then dissolved in 175 grams of toluene at 280° F. A piece of cloth weighing 1.142 grams and having a thickness of .020 inch was dipped into the solution. The coated cloth (tape) was then dried at a temperature of about 280° F. until all the toluene had been evaporated off. The tape was cured at about 350° F. for about 30 minutes and was found to be 80% insoluble after immersion in xylene for 24 hours at about 175° F. The resistivity of the cured tape, as measured by the well known "National Bureau of Standards" (NBS) Electrical Resistivity Test, was only 9.2 ohm-cm.

Example 5

100 parts of "Super Dylan 6200," a high density polyethylene polymer produced by Koppers Company, Inc., having a density of 0.96, 40 parts of "Vulcan XC–72" and 2 parts of dicumyl peroxide were milled in a Banbury mixer until a substantially homogeneous composition was obtained. 40 grams of this composition was then dissolved in 175 grams of xylene. A piece of cloth was dipped into the solution. The "tape" was then dried at a temperature of about 300° F. until all the xylene had been evaporated off. The tape was cured at about 350° F. for about 30 minutes and was found to be 74% insoluble after immersion in xylene for 24 hours at 230° F. The resistivity of the tape, as measured by the above-mentioned NBS test, was only 17.6 ohm-cm.

Obviously, many changes may be made in the above-described procedures without departing from the scope of the invention. For example, a conductive coating or layer can be conveniently continuously applied to wire or cable according to the present invention by passing the wire or cable continuously through a solution of the type utilized in Examples 3 and 4 above. Following curing of this conductive layer (the curing can also be done on a continuous basis if desired, for example by passing the coated wire or cable continuously through a heating zone) an insulating layer can be applied over the said conductive layer by extrusion, according to the teachings of the present invention, or in any convenient manner. Also, although only carbon black was specifically mentioned as a suitable conductive filler, other conductive fillers such as graphite are suitable for the purposes of the present invention. Accordingly, it is intended that the above disclosure be regarded as illustrative and as in no way limiting the scope of the invention.

What we claim is:

1. A process for producing a flexible electrically conductive tape which process comprises the steps of applying to a flexible substrate a liquid composition comprising a curing agent, and a solvent having dissolved therein a material chosen from the group consisting of polyethylene, polypropylene, polybutene, and copolymers thereof, and mixtures thereof, and having dispersed therein between 40 and 125 parts of carbon black by weight per 100 parts of said material, evaporating off said solvent from said composition and heating the composition remaining to curing temperatures.

2. The process of claim 1 wherein the total carbon black loading is substantially above 50 parts by weight and is made up of a blend of conductive carbon black and ordinary carbon black, the loading of conductive black being between about 20 and 40 parts.

3. The process of claim 1 wherein the said material dissolved in the said solvent comprises polyethlene.

4. The process of claim 1 wherein the said material dissolved in the said solvent comprises polypropylene.

5. The process of claim 1 wherein the said material dissolved in the said solvent comprises polybutene.

References Cited in the file of this patent

UNITED STATES PATENTS

| 1,715,879 | Wells | June 4, 1929 |
| 2,561,063 | McBruney et al. | July 17, 1951 |
| 2,683,673 | Silversher | July 13, 1954 |
| 2,928,756 | Campbell | Mar. 15, 1960 |
| 2,953,482 | Scherber | Sept. 20, 1960 |
| 2,995,529 | Smith-Johannsen | Aug. 8, 1961 |
| 3,022,213 | Pattilloch et al. | Feb. 20, 1962 |

FOREIGN PATENTS

| 1,050,610 | France | Sept. 2, 1953 |
| 1,011,948 | Germany | July 11, 1957 |

OTHER REFERENCES

Vinyl and Related Polymers, "Schildknecht," 1952, John Wiley & Sons, Inc., New York, page 516.